United States Patent

[11] 3,542,134

| | | |
|---|---|---|
| [72] | Inventor | Arden A. Wigness<br>Fortuna, North Dakaota 58844 |
| [21] | Appl. No. | 704,923 |
| [22] | Filed | Feb. 12, 1968 |
| [45] | Patented | Nov. 24, 1970 |

[54] ROD WEEDER DEVICE
3 Claims, 11 Drawing Figs.

[52] U.S. Cl. .................................................. 172/195, 172/44
[51] Int. Cl. .................................................... A01b 49/02
[50] Field of Search ....................................... 172/195, 197, 44, 762, 767, 189, 612, 199, 200, 72

[56] References Cited
UNITED STATES PATENTS
1,727,253  9/1929  Severance ..................... 172/612

3,033,294  5/1962  Edwards........................  172/44
3,186,494  6/1965  Jackson........................  172/44

*Primary Examiner*—Robert E. Pulfrey
*Assistant Examiner*—Ronald C. Harrington
*Attorney*—Robert E. Kleve ABSTRACT: The invention comprises a rod weeder and a farm implement. The rod weeder has a plurality of rods placed in end to end relation across the back of the implement. One loop elongated laterally of the length of the rods is fixed to one of the confronting ends of one of the rods, and another loop elongated parallel to the length of the rods is fixed to the confronting end of an adjacent rod and interlooped with the first loop. At least three link chains in spaced relation to one another connect the rods to the implement. At least one of the chains is connected to the rods by being connected to one of said loops.

Patented Nov. 24, 1970
3,542,134
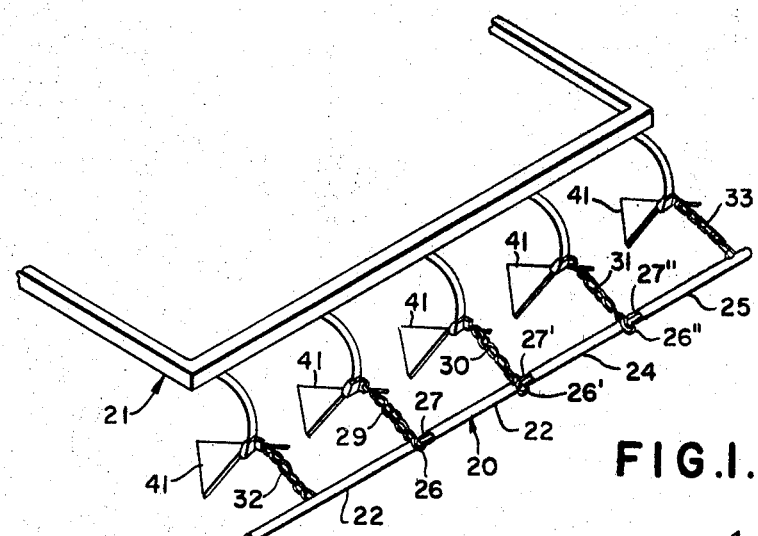
FIG.1.
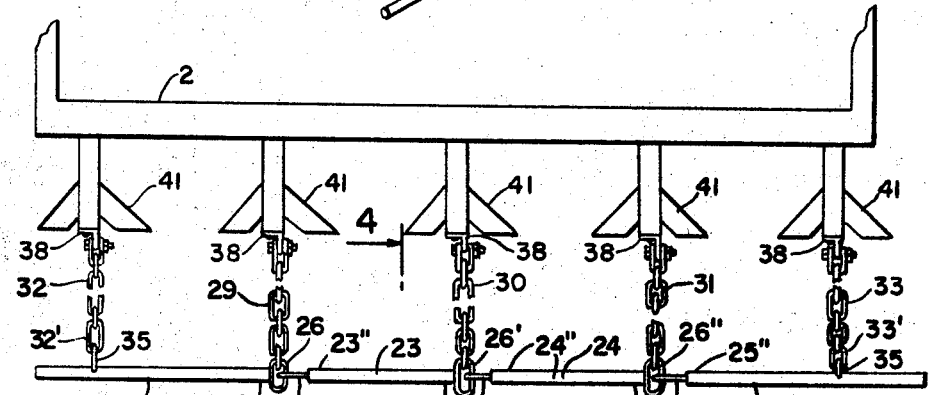
FIG.2.
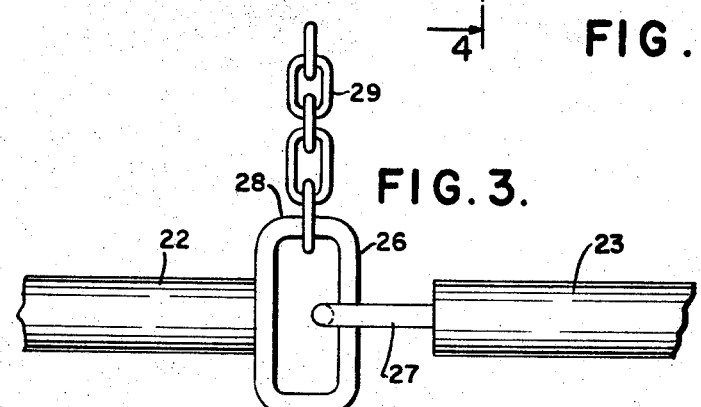
FIG.3.
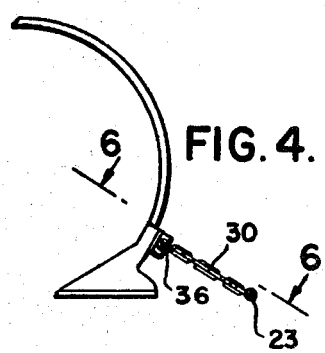
FIG.4.
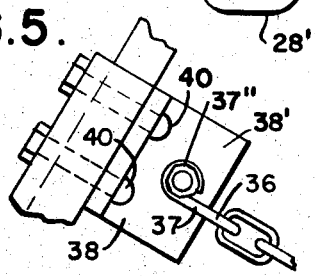
FIG.5.
FIG.6.
INVENTOR
Arden A. Wigness
BY Robert E. Kleve
ATTORNEY INVENTOR
Arden A. Wigness BY Robert E. Kleve

ATTORNEY

ROD WEEDER DEVICE

This invention relates to rod weeders more particularly, the invention relates to rod weeders for field cultivators.

It is an object of the invention to provide a novel rod weeder which can be detachably fastened behind a field cultivator and employed to remove weeds and level and pack ground and which can be readily folded and transported and stored.

It is a further object of the invention to provide a novel, simplified, easily foldable, rod weeder attachment.

It is another object of the invention to provide a novel simplified rod weeder attachment which can be quickly detached from a cultivator and folded into a compact form for storage.

It is another object of the invention to provide a novel nonrotating rod weeder.

Further objects and advantages of the invention will become apparent as the description proceeds and when taken in conjunction with the accompanying drawings wherein:

FIG. 1 is a perspective view of the novel rod weeder attachment invention.

FIG. 2 is a top plan view of the rod weeder invention.

FIG. 3 is an enlarged fragmentary view of the rod and chain connection of the rod weeder invention which enables easy folding of the rods together when not in use.

FIG. 4 is a cross-sectional view of the rod weeder attachment taken along line 4-4 of FIG. 2.

FIG. 5 is an enlarged side view of the attachment of the rod chain to the cultivator shank.

FIG. 6 is a cross-sectional view taken along line 6-6 of FIG. 4.

Figure 8:
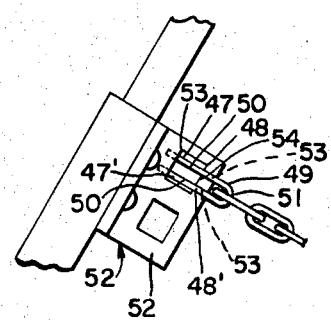
FIG. 8 is an enlarged fragmentary side view of a modified form of attachment of the rod chain to the cultivator shank.
Figure 9:
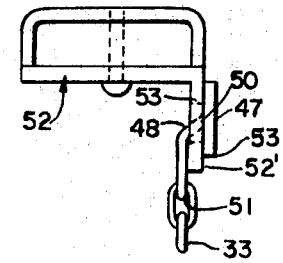
FIG. 9 is a cross-sectional view taken along line 9-9 of FIG. 8 disclosing the modified attachment of the rod chain to the cultivator shank of the modified invention.

Briefly stated, the invention comprises a rod weeder having a plurality of nonrotatable rods placed in end to end relation across the back of a field cultivator, said rods having a laterally elongated loop at one end and a longitudinally extending rod at their other ends in interconnecting relation whereby said rods may be folded together for storage, a plurality of chains connected at one of their ends to the laterally elongated loops of the rods and detachably connected at their other ends to the rear of the cultivator shanks.

Referring more particularly to the drawings, in FIG. 1, the rod weeder invention 20 is shown attached to the rear of a field cultivator 21. The rod weeder invention has a plurality of cylindrical weeder rods 22, 23, 24, and 25, which are connected together by laterally elongated loops 26, 26', and 26" and horizontally elongated loops 27, 27', and 27". The loops 26-26" being looped to loops 27-27" respectively. The laterally elongated loops 26, 26', and 26" are fixed to the one ends 22', 23', and 24' of rods 22, 23, and 24, and the horizontally elongated loops 27, 27', and 27" are fixed to the other ends 23", 24", and 25" of the rods 23, 24, and 25.

The loops 26, 26', and 26" are laterally elongated so that the rods 22, 23, 24, and 25 may be folded together in a zigzag fashion with the laterally elongated portions 28 and 28" enabling the loops 27, 27', and 27" to swing out and pivot about to place rods 22, 23, 24, and 25 in parallel adjacent relation to one another, for easier storage, portability and compactness.

Three link chains 29, 30, and 31 have their lowermost links attached to the lateral loops 26, 26', and 26" respectively, while chains 32 and 33 have their lowermost links 32' and 33' looped through loops 35 and 35'. The loops 35 and 35' are fixed to rods 22 and 25 respectively.

The upper ends 29", 30", 31", 32", and 33" of the link chains each have a U-shaped rod 36 with the uppermost link of each of the chains 29—33 being looped through the U-rod 36. The legs 37 and 37' of the U-rods 36 form loops and encircle the bolts 37 on opposite sides of the lateral flange portion 38' of each of the L-shaped flanges 38. The lateral flange portion 38' has a bore to allow the bolt 37 to pass through with nuts 39 threaded onto opposite ends of the bolt 37 to lock the U-rod 36 to the flange portion 38' of the L-shaped flange 38 to thereby secure the upper ends of chains 29—33 to the cultivator shanks.

The L-shaped flanges 38 are bolted to the back of the cultivator shanks 39 by bolts 40. Cultivator shovels or sweeps 41 are bolted to the front of the lower ends of the shanks 39.

In the modified form of the rod weeder invention illustrated in FIGS. 7—11, inclusive, the rods 22, 23, 24, and 25 (FIGS. 7, 10, and 11) and their laterally elongated loops 26, 26', and 26" are the same as illustrated in FIGS. 1—6, inclusive. The horizontally elongated loops 42, 42', and 42" are similar to the horizontally elongated loops 27, 27', and 27" and are interlooped with loops 26, 26', and 26", respectively, except that loops 42, 42', and 42" are separable. The loops 42, 42', and 42" each are formed of two separate loop rod portions 44 and 44'. The loop rod portion 44' has an eyelet 45 mounted to its outer end with the outer end of the loop or loop rod portion 44 passing through the eyelet 45. The loop portion 44' may be bent out and upward in a counterclockwise direction, when viewed from FIG. 11, about the axis of the inner end 46 of the loop portion 44'. The inner end 46 of each loop portion 44' being fixed or welded to the respective adjacent weeder rod 23, 24, or 25. The loop portions 44' by being bent outward removes the eyelets 45 from the loop portions 44 thereby separating loop portions 44 and 44' from one another of each loop 42, 42', and 42" whereby the lateral loops 26, 26', and 26" may be removed from the loops 42, 42', and 42" thereby separating the weeder rods 22, 23, and 24 and 25 from one another.

The separable loop 42 may be employed only for rods 22 and 23, while the regular loops 27' and 27" may be employed for connecting the rods 23, 24, and 24 together so that a longer rod 22 may be substituted having a longer left end 22'"; or additional rod sections may be added for wider cultivator frames to extend the overall length of the weeder rods as assembled.

Figure 7:
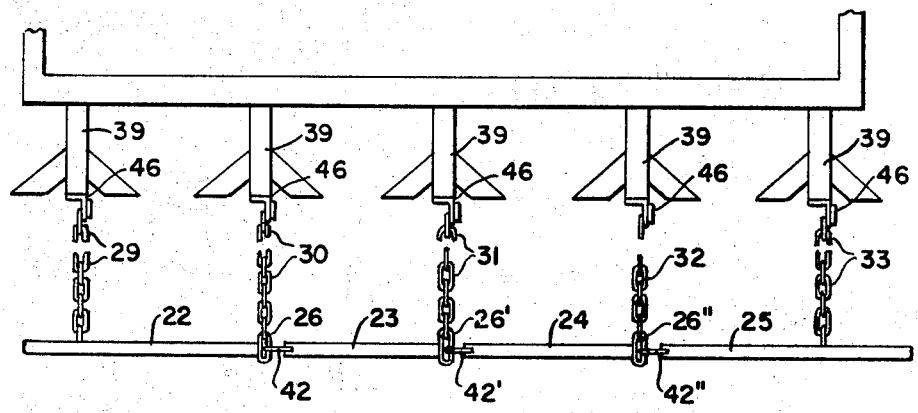
FIG. 7 is top plan view of a modified form of the rod weeder attachment.
Figure 10:
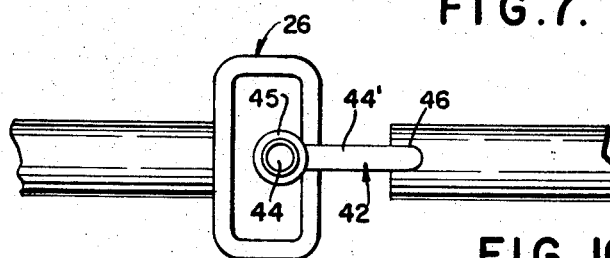
FIG. 10 is an enlarged fragmentary top view of the modified attachment of the rod chain to rod weeder of the modified invention.
Figure 11:
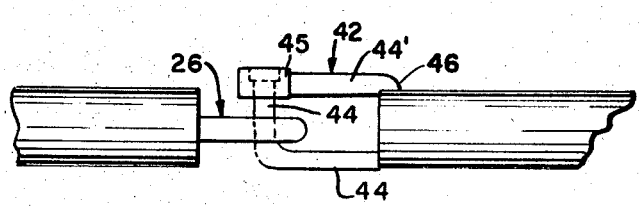
FIG. 11 is an enlarged fragmentary side view of the modified attachment of the rod chain to the rod weeder of the modified invention.

After the loop portions 44 and 44' have been opened and longer or different rod sections have been substituted, the loop portion 44' will be bent back to its position illustrated in FIGS. 10 and 11 with the eyelet passes over the outer end of the loop portion 44 as shown in FIGS. 7, 10, and 11.

The loop portions 44 and 44' will be made of iron or other material which may be bent in the foregoing manner without fracturing.

In the modified form of the invention, illustrated in FIGS. 7-11, the upper ends of the chains 29—33 are mounted to the rear of the cultivator shank 39 by quickly detachable hook devices 46.

The hook devices 46 each have a pair of rods 47 and 47' which are straight and elongated and in parallel relation to one another and are welded intermediate their length to the remote ends 48 and 48' of a U-shaped rod 49. The U-shaped rods 49 each have a lateral bend in their legs adjacent their outer ends 50 and 50' so that the apex 51 of the U-rod 49 may rest on one side of the flange 52' while the ends of the legs 50 and 50' may pass through the square hole 53 in the flange 52 to connect with the rods 47 and 47'.

To remove the hook device 46 from the flanges 52' of the L-shaped flanges 52, the hooks are slid upward when viewed from FIG. 8 until the lower end 53 of the rods 47 and 47' are adjacent the lower edge 54 of the square hole in the flange 52, whereupon the hook device will be pivoted clockwise when viewed from FIG. 8 about the axis of the lower end 53 of the rods 47 and 47' until the hook device is approximately 90° from its former position whereupon the hook device is free to be slid from right to left, when viewed from FIG. 8, and out of the rectangular opening 53 in the flange 52' of the L-shaped flange.

The upper ends of each of the chains 29—33 are hooked to the respective U-rod of each respective cultivator shank 39, and the L-shaped flanges 52 are bolted to the back of the cultivator shanks while the cultivator shovels or sweeps 41 are bolted to the front of the shank.

Thus, the hook devices 46 are quickly detachable from the shank 39, thereby enabling the rod weeder device to be quickly detached from the cultivator.

Thus, it will be seen that a novel rod weeder has been provided which can be inexpensively made and easily detached and collapsed together for storage and transportation.

The rod weeder rods 22, 23, 24, and 25 are nonrotatable as it has been found by testing that the rods as mounted and employed in this invention will pull weeds and level land quite satisfactorily without rotating the rods during the operation.

It will be obvious that various changes and departures may be made to the invention without departing from the spirit and scope thereof and accordingly, it is not intended that the invention be limited to that specifically described in the specification or as illustrated in the drawings but only as set forth in the appended claims wherein:

I claim:

1. A device comprising a rod weeder in combination with a farm implement, said rod weeder comprising a plurality of nonrotatable rods placed in confronting end to end relation to one another across the back of the farm implement, a loop elongated laterally of the length of one of said rods and fixed to the end of one of the confronting rods, a loop elongated in a direction parallel to the length of the rods and fixed to the confronting end of the adjacent one of said rods and interlooped with said first mentioned loop, at least three elongated linkage means connected at their one ends to said rods and extending laterally away from said rods in spaced relation to one another with their other ends attached to said farm implement.

2. A device according to claim 1 wherein at least one of said linkage means is connected at its said one end to one of the loops of said rods.

3. A device according to claim 1 wherein said elongated loops are elongated sufficiently that said rods may be folded into parallel adjacent relation to one another when not in use.